United States Patent [19]

Durham et al.

[11]  4,238,374
[45]  Dec. 9, 1980

[54] BOUND AGGREGATE METHOD AND COMPOSITION

[75] Inventors: Robert L. Durham, Houston, Tex.; John H. McKenzie, Naples, Fla.

[73] Assignee: Agritec, Inc., Houston, Tex.

[21] Appl. No.: 30,199

[22] Filed: Apr. 16, 1979

[51] Int. Cl.³ .............................................. C08L 3/02
[52] U.S. Cl. ........................... 260/17.4 GC; 47/41.12; 47/DIG. 7; 260/17.4 SG
[58] Field of Search ............................. 260/17.4 GC

[56] References Cited

U.S. PATENT DOCUMENTS

| | | | |
|---|---|---|---|
| 3,831,317 | 8/1974 | Porte | 47/58 |
| 3,973,355 | 8/1976 | McKenzie | 47/59 |
| 3,981,100 | 9/1976 | Weaver et al. | 47/59 |
| 4,034,508 | 7/1977 | Dedolph | 47/84 |

OTHER PUBLICATIONS

Chem. Absts. vol. 85: 22507c, Rigid Urethane Foams as a Support for Flowers and Plants, Ezra, Gabriel et al.

*Primary Examiner*—Edward M. Woodberry
*Attorney, Agent, or Firm*—Fulbright & Jaworski

[57] ABSTRACT

A method and composition is disclosed which is particularly suitable for forming a firm, bound aggregate-water support for floral arrangements with at least 60% by weight water. The composition comprises a water-insoluble, water-retaining binder, such as a particulate, water-insoluble, water-swellable, cross-linked polymer, and inert non-packing, highly porous water-trapping, aggregate particles dispersed throughout, the particles being present in an amount and having a bulk density and surface area effective to disperse the composition throughout the water as the composition is added to it without hand kneading or stirring. The binder should have water retention properties of at least 100 gm/gm. The aggregate particles should have an open structure and water retention properties of at least 4 gm/gm, have a surface area of at least about 10 m²/gm and an apparent bulk density of not over 30 lbs/sq.ft. to avoid packing. Only sufficient binder should be present to firmly bind the aggregate particles together, for example from about 0.1% to about 1.0% by weight, although higher amounts of binder can be used. Rice hull ash is preferred as the aggregate and the preferred binder is a starch, acrylonitrile graft copolymer. For most cut live flowers and to avoid mold, the composition should be acidic, but not too acidic to break the bond, for example a pH down to about 5.5 for some binders is satisfactory; although a pH down to 4 and below for cut flowers is satisfactory so long as the binder's bond is not broken. If desired, a higher pH, for example up to about 8.5 can be used. Advantageously, the composition can be added to water in a container of any size or shape in an amount sufficient to form the bound aggregate and the composition sinks in and disperses throughout the water and forms a support without the need for mixing with a mixer or kneading with the hands. Advantages and representatives uses are set forth below.

30 Claims, No Drawings

BOUND AGGREGATE METHOD AND COMPOSITION

BACKGROUND OF THE INVENTION

While the present invention has a variety of uses, it is particularly suited for use in supporting floral arrangements in containers for decorative purposes.

The floral industry distributes and sells fresh flowers made into arrangements for decorative purposes. These arrangements are made by professional designers trained in this art form. Originally, cut flowers were simply arranged in vases or containers filled with water. This caused problems in transporting the flowers from the shops to the consumers in that the arrangements were not held in place and became disarranged. The need to hold the flowers in an arranged manner resulted in the development of rigid floral forms for this purpose. These foams are made from polymer forming chemicals that release gases when the polymers are formed thus causing foaming. These foams are rigid and must be shaped to fit the container. These foams are normally marketed in the form of blocks and the florist must cut these rigid foams to the required shape and size to fit in the containers. This results in waste scrap and requires time and work for shaping and sizing of the foam to fit the container and taping in place. In addition, since these foams are rigid, once the stem of a flower is inserted into the foam it cannot be removed and reinserted without leaving a hole where it was inserted.

Also, ground rigid foam and foam pellets have been used for supports for floral arrangements; however, this has not been satisfactory in that the floral arrangement easily shifts since good stable support is not provided.

Numerous materials, such as sand, dirt, rocks, etc. can be used to hold flowers rigidly in place; however, these are generally unsatisfactory for a variety of reasons.

Also, there are spillage problems with prior art floral supports. For example, a large number of funeral homes will not permit containers with water in their parlors due to spillage on expensive carpets.

U.S. Pat. No. 2,971,292 discloses the use of various clays, alkali silicates and similar materials to form a support for fresh flowers. Products made from these materials and by the techniques described therein are unacceptable in the florist industry as all of these materials require vigorous mixing or hand kneading, they must be present in large amounts to provide support and tend to pack in place, they displace too much water in vases rather than holding water in an open structure of the particles thus providing inadequate water to the fresh flowers, they pack in such a manner to prevent easy insertion of fresh flowers and shift due to the lack of binding properties between the gel substance and other aggregates that they are used with in conjunction with the gel. The support disclosed by this patent has never been marketed on any substantial scale.

U.S. Pat. No. 3,973,355 discloses a live plant growth mixture in which plant growth material is coated with water-insoluble, water-swellable, cross linked polymers and pressed and dried into a hard mass. When added to water in large quantities such as is necessary for fresh flower longevity, this material does not provide adequate support for floral arrangements and when added in very large ratios of material to water, there is inadequate water available for the flowers.

Other U.S. Pat. Nos. disclose the use of moss and water (1,562,992 and 2,971,292), solid or crushed urea-formaldehyde (2,753,277) and plastic foam (2,774,187).

In short, when floral supports are made with the materials and techniques used in the above-mentioned and described above patents, an inferior, impractical support is obtained for supporting and inadequate water is provided to cut flower arrangements.

It would be highly desirable to provide a support for floral arrangements such as cut fresh flowers, dried flowers, artificial flowers, fern and the like, in which the dry ingredients can be added directly into water in a container without agitation and which will automatically disperse throughout and fall into place in the water and form a firm support for fresh flowers that is uniform and attractive, which firmly holds the floral arrangements in position, which provides adequate water to fresh flowers, in which there is no waste or scrap, no shaping or sizing of the support is necessary, there is no spillage or slipping during transportation and use of the arrangements, in which rearrangement in the design can be easily made by removing plant stems and pressing the undesirable holes back into a solid position without any damage or crumbling to the support and reinserting the plant stems where desired, which can be used easily with large accessories, such as candles, which gives a uniform appearance in transparent containers, which can be removed easily from a container by flushing with warm water, and which can be reused simply by permitting the bound aggregate support to dry and adding additional water.

SUMMARY OF THE INVENTION

The present invention is directed to such a composition and method of manufacture which provides a support for arrangements of flowers and accessories which has the foregoing advantages and which does not have the disadvantages of previous floral supports and one which can be used for transporting and rooting of live flowers and plants.

The composition of the present invention comprises a water-insoluble, water-retaining binder, such as a particulate, water-insoluble, water-swellable, cross-linked polymer which binds inert aggregate particles together, the particles being present in the composition in an amount and having a bulk density and surface area effective to disperse the composition in the water as the composition is added to it, thereby making hand kneading, stirring or mixing unnecessary to form a firmly bound aggregate having water dispersed throughout. The binder, such as a polymer, should have water retention properties of at least 100 gm/gm. The particles should have an open structure capable of holding large quantities of water, have a surface area of at least about 10 $m^2$/gm and have an apparent bulk density of not over 30 lbs/sq.ft. to avoid packing. The bound aggregate water mass or support should be at least 60% by weight water and preferably 75% to 80% by weight water to provide adequate water to fresh flowers, yet be firm enough to support flowers and floral components in position. Preferably, the binder is present in the composition in an amount of from about 0.1% to about 1%; although up to 5% by weight and higher can be used. The more binder, however, the less liviability of fresh flowers in the bound aggregate water support. The presently preferred polymer is a starch, acrylonitrile graft copolymer, and the presently preferred aggregate is rice hull ash, and preferably the ash is present in an amount of about 95-99% by weight of the composition.

For cut flowers, preferably, the composition should be acidic, for example down to a pH of about 5.5, the lower pH being limited by breaking of the binding effect of the binder. For example, most cut flowers stay fresh longer in water that is slightly acidic to neutral. This reduces the chance of vascular blockage by bacteria, which prefer a pH of above 7.0. But roses, for example, stay fresh longer at a pH of 3 to 3.5. Accordingly, a pH lower than 5.5 may be used so long as the binding effect of the binder is not broken. Also, an acidic pH prevents the formation of mold on the surface of the composition in use. Good livability of most flowers, except rose plants, is obtained by having the pH of from about 5.5 to about 8.5. Inert coloring pigments, pH buffering agents, plant preservatives and nutrients can be added.

The method of the invention comprises adding the compositon of the invention into a desired amount of water in a container in an amount sufficient to form a firmly bound aggregate. No mixing, stirring or hand kneading is necessary as the composition disperses throughout the water. For most uses, about 0.2 pounds of the composition is added for each pound of the water present in the container. The composition, however, is simply added until a solid is formed, a slight amount of excess is then added to the surface and pressed down. At this time a firmly bound aggregate-water support is formed, it will not come out of the container even though the container is turned upside down, and it provides an excellent rigid support for floral arrangements and provides adequate water to the fresh flowers.

The composition is also very effective for transporting fresh cut flowers as moisture is readily taken up by the stems from the bound aggregate, and also is advantageous for use in rooting plants.

Accordingly, it is an object of the present invention to provide an improved composition and its method of manufacture, which is particularly advantageous for use in supporting floral arrangements, transporting of fresh cut flowers, and rooting of various plants.

A further object of the present invention is the provision of an improved composition and its method of manufacture which provides a firmly-bound aggregate water mass having at least 60% by weight water and yet will firmly support floral arrangements and provide adequate water to fresh flowers.

A further object of the invention is the provision of a composition, and its method of manufacture, which is a combination of a highly porous, non-packing, solid aggregate held firmly in place by a water-insoluble, water-retaining binder that is not dissolved when added to water but stretched between and binds the solid porous particles to prevent shifting and impaction, is easily penetrated by the tender stems of fresh flowers and requires no special preparation and no mixing or stirring when added to water in a vase or container.

A further object of the present invention is the provision of such a composition and its method of manufacture, in which the composition readily conforms to the shape of the container eliminating any waste or scrape and work for shaping or sizing to the container yet provides a firm support for floral arrangements and provides adequate water to fresh flowers inserted into it.

A further object of the present invention is the provision of such a composition and its method of manufacture, in which there is no spillage or slipping of the floral arrangement in transporting it, which is easy to use in that it requires no premixing, which may be used in containers having narrow openings, and one in which mistakes can be corrected or changes in design can be made easily and simply by removing the stem of the plant or accessory, pressing in the hole left thereby, and pressing the plant or accessory into position at another location.

A further object of the present invention is the provision of such a composition and its method of manufacture, which can be used easily and readily for floral arrangements including large accessories, such as candles, which provides a uniform and pleasing appearance, for example when used in transparent containers, which is easy to remove from the container by flushing with warm water, and which may be reused after drying out by simply adding water to the composition.

Other and further features, objects and advantages, as well as uses, will appear to those skilled in the various arts to which the invention is directed, some of which are mentioned herein.

DESCRIPTION OF PRESENTLY PREFERRED EMBODIMENTS

The composition of the present invention comprises inert aggregate particles bound together when added to water by a water-insoluble, water-retaining binder, such as a particulate, water-insoluble, water-swellable, cross-linked polymer, the particles being present in an amount and having a bulk density and surface area effective to disperse the composition in water as the composition is added to it. Just enough binder should be present to bind the aggregate particles together. Excess binder reduces flower livability by restricting water take up by the fresh flowers. For most binders and aggregates, the binder is present in an amount of from about 0.1% to about 5.0% by weight, preferably about 1.0% by weight, with the remainder being the inert aggregate particles. Any desired coloring pigment, pH buffering agents, preservatives and plant nutrients and the like can be added as desired. For live cut flowers, preferably the composition should have an acidic pH, the lower limit being set so as not to break the bond of the binder. A satisfactory pH range in which the bond is not broken is from about 5.5 to about 8.5 which provides good livability of most flowers, except roses which prefer a more acidic pH of about 3.0 to 3.5. The composition is simply added to water in which it disperses throughout and forms a firmly bound water aggregate. Good results are obtained by simply adding the composition to water in a container until such time as a composition is formed with the water into a bound solid mass, at which time a small additional amount of the composition is placed on the surface and generally pressed down to form the finished composition. For most materials about 0.2 pounds of the composition is present for each pound of the water in the container; although, it is unnecessary to measure the amount of composition placed in the water which greatly simplifies the formation of the desired end product.

The binders, that is bridging and holding materials, include the water-swellable polymers, which include any cross-linked species of a polymer whose linear analog is water-soluble. Typical of such materials are cross-linked monovalent cation salts of polyacrylic, polymethacrylic, polysulfoethyl acrylic and polysulfoethyl methacrylic acids, cross-linked substantially water-insoluble, water-swellable sulfonated alkaryl and aromatic polymers, such as, for example, cross-linked polysodium styrene sulfonate and sulfonated polyvinyl toluene salts; copolymers of such sulfonated alkaryl and aromatic materials with acrylonitriles, alkyl acrylonitriles, acrylates and methacrylates; cross-linked polyvinyl alcohol and polyacrylamide and cross-linked copolymers of polyacrylamide as, for example, the cross-linked copolymer of acrylamide and acrylic acid and of acrylamide and the monovalent salts of acrylic acid; cross-linked heterocyclic monomers, such as polyvinyl morpholinone, poly-5-methyl-N-vinyl-2-oxazolidinone and polyvinyl pyrrolidone; other cross-linked water-swellable but water-insoluble polymers or copolymers can also be employed.

Such materials as the above-named polymers can be made by a variety of known methods. For example, the substantially water-insoluble, water-swellable, cross-linked polyacrylate salts may be prepared by chemical cross-linking as shown in British Pat. No. 719,330, or, alternatively, by subjecting a mixture of a monovalent cation salt of acrylic acid and water to the influences of high energy ionizing radiation for a period of time sufficient to effect the desired polymerization and the cross-linking of at least a portion of the polymer produced. In the latter instance, the amount of ionizing radiation should be at least about 0.5 megarad but greater or lesser amounts may be employed. In any event, the amount of radiation must be great enough to give a swellable polymer which takes in water or aqueous solutions and, in so doing, increases in volume but generally retains its original shape. With this class of polymeric materials, it is critical to the present invention that the salt-forming cation be monovalent. Representative examples of monovalent cations include, for example, the alkali metals, that is, sodium, potassium, lithium, rubidium and cesium, we well as water-soluble ammonium-like radicals based upon the quaternary nitrogen atom.

Other methods for preparing such cross-linked materials may be found in U.S. Pat. No. 2,810,716, issued Oct. 22, 1957, to Markus. The acrylamide polymers and copolymers may be chemically cross-linked, in addition to the materials disclosed in that patent, with methylene-bisacrylamide as the cross-linker.

For a further description of such water-insoluble, water-swellable polymers reference is made to U.S. Pat. Nos. 3,090,736 and 3,229,769. If desired any water-insoluble or substantiably water-insoluble adhesive can be used in an amount sufficient to coat the particles of the mix, such as disclosed in U.S. Pat. No. 3,407,138.

These polymers differ from water-soluble polymers such as methylcellulose, casein, sodium alginate, locust bean and the natural gums in that the latter form viscous liquids in low concentrations. These polymers also differ markedly from colloid forming clays such as attapulgite, bentonite and others in that the clays simply swell, have very limited ability to stretch throughout water and have little or no ability to serve as a binder for other aggregates in the presence of large quantities of water. Accordingly, these polymers are not easily leached out by repeated watering of the plants and continue to act as binders for the other portions of the mix in water over a long period of time. Advantageously, they also increase the water retention capacity of the mix considerably.

Presently preferred polymers are a hydrolyzed starch, acrylonitrile graft co-polymer, which is manufactured and marketed by General Mills; and Norbak, which in the past has been manufactured and marketed by Dow Chemical Company.

Any water-insoluble, water-retaining, highly expandable gel forming polymer or other binder which holds in place aggregates having a large amount of open structure are satisfactory and thus forms an ideal medium for uses in floral design holder, for example, fibrous cellulase. Any water-insoluble binder having water retention properties in excess of about 100 grams per gram is highly satisfactory for use in the composition and method of the invention.

Any inert aggregate particles can be used which have open structures resulting in high water holding capabilities, at least 4 gm of water per gram of aggregate, a surface area of at least about 10 sq. meters per gram and an apparent bulk density of not over about 30 lbs/sq.ft. to avoid packing. These include rice hull ash, ground silica gel, ground aluminum hydrogel, silica alumina cracking catalyst (as used in the petroleum industry), expanded mica, expanded pearlite aluminum oxide, and silica oxide which have the foregoing water-retention properties and surface area. The presently preferred aggregate is whole rice hull ash which is essentially the silicon skeleton of rice hulls and hence has a large amount of open structure with high water holding properties and which is heavy enough to sink in water and is available at relatively low cost. Some of the foregoing aggregates tend to float and initially need to be pushed down into the water, but they then stay under the water and disperse throughout it; for example, ground rice hull ash, expanded pearlite and expanded mica.

Any suitable coloring pigments or agents which will not break the bond of the binder can be included, which include oxides of chromium, iron, copper, manganese and similar materials used as pigments.

The pH of the composition may be adjusted by the addition of boric acid in amounts of about 1% by weight. Also small amounts of mineral acids such as $H_2SO_4$ or $HNO_3$ and organic acids such as acetic acid or citric can be used.

A flower preservative can be added if desired. These flower preservatives are essentially sucrose with a small amount of a bacterial growth retardent added. The preferred flower preservative contains 1% sucrose as a mixture of sucrose and hemicellulose extract plus 0.01 percent 8-hydroxyquinoline citrate to prevent bacterial growth and plugging of the flower stems.

Small amounts of plant nutrients can be added, if desired. For a suitable list of plant nutrients and other agricultural chemicals which can be added to the composition, reference is made to U.S. Pat. Nos. 3,231,363; 3,692,512; 3,838,075; and 3,973,355.

The methods of the invention comprise mixing the binder, such as the polymer or copolymer, with the aggregate, including any coloring agents, buffering pH agents, floral preservatives, nutrients and the like as desired, in proportions previously set forth. These are mixed dry in the proportions previously set forth in a mixer, such as a ribbon blender. The composition is then added to a vase or other container having water in it from about 60% by weight to about 80% of the desired final level. The composition is added to the water slowly, allowing the composition particles to disperse throughout the water. The composition is continued to be added until the solid particles are slightly above the water level. No mixing, stirring or hand kneading is required or needed when the aggregate is or has the properties of rice hull ash; although, some of the other aggregates may need to be pressed down gently into the water. The composition is then pressed and firmed, such as with the fingers, or a flat object such as a trowel. If a firmer support is desired, additional small amounts of the composition are added and the composition is pressed again. This is repeated until the desired firmness is achieved. This provides a firm floral support with good availability of water to the plants and an increase in volume of only about 20%. The flowers and other floral decorations, such as cut flowers, dried flowers, artificial flowers, ferns, candles and the like, are added by inserting portions of them into the support until the floral decoration has been made. During the arranging of the floral components of the floral decoration, if desired the stems of flowers, ferns or portions of the floral decorations can be removed, the opening left by the removal pressed back into place as a solid and these members reinserted where desired. The composition keeps the finished design in place for days and, in the case of fresh flowers, maintains the fresh flowers fresh and alive for days.

When it is ready to discard the display, the floral components can simply be removed, the container can be flushed with warm water to thereby remove the gel particles so that the container can be used again for other floral arrangements. If desired, the gel particles can be saved, dried and reused as previously described.

EXAMPLE 1

In this example water was added to a florist vase in an amount to fill approximately 75 percent of the vase. A dry composition comprising 99 percent by weight rice hull ash and 1 percent by weight hydrolized starch acrylonitrile (SGP-5025) obtained from General Mills, was added as described previously. This resulted in the final mix containing about 0.2 pounds of the composition for each pound of water. The resulting bound water aggregate was firm without any free water apparent yet contained about 75% to 80% by weight water thus providing good water supply to fresh flowers. The stems of various fresh cut flowers were then inserted into the mixture in a floral arrangement. The flowers added were:
1. Daisy
2. Pixie Carnation
3. Cushion Pom
4. Jackstraw
5. Fuji Mum The bound water aggregate composition held the flowers firmly in place. The flowers maintained their beauty and livability for approximately 7 to 9 days. The arrangement was readily transportable without any spillage or slippage of the floral arrangement.

EXAMPLE 2

This example is the same as Example 1 except that the SGP-5025 polymer was increased to approximately a 5% by weight level. The results obtained were the same as in Example 1 except that the livability of the flowers was reduced to about four days. This is apparently due to the gel thickness being too great for easy water uptake by the flowers.

When the pH of the mixture was quite acidic (below pH 4.0) or basic (above pH 8.5) the flower lifetime of the above listed flowers was decreased. Also, above pH 8.5, a mold formed on the surface of the floral support.

EXAMPLE 3

In this example the composition comprised a series of mixtures of ground silica gel, ground alumina hydrogel, silica alumina cracking catalyst (as used in pertroleum industry), fly ash, and aluminum oxide, with fibrous cellulose and with Norbak in the amounts of from 95 to 99% by weight aggregate and 1% to 5% by weight binders. These compositions were added to water and flowers were inserted in the bound aggregate as indicated in Examples 1 and 2 with results similar to those of Examples 1 and 2.

EXAMPLE 4

In this example, three formula variations were studied using cut flower life in each formula as the response. Flowers were considered to have expired when their appearance was slightly wilted thus rendering them unsaleable.

|  | Percent by Weight |
|---|---|
| Formula I | |
| Rice Hull Ash | 99.5% |
| SGP polymer | .5% |
| Formula II | |
| Rice Hull Ash | 99.0% |
| SGP polymer | 1.0% |
| Formula III | |
| Rice Hull Ash | 96.0% |
| SGP polymer | 1.0% |
| Sucrose | 3.0% |

Tap water was added to three identical florist vases in an amount to fill about 75% of the vase. Each of the above formulas were added into the water in each of the vases, one formula per vase until there was no apparent free water. The volume expansion in each of the vases was approximately 15%. An equal number and variety of fresh flowers were then inserted into the formulas and the vases placed side by side on a table for visual observation. Flowers used in the test included carnations, daisys, mums and roses. All of the roses expired after one day. All of the other flowers remained fresh in each of the three formulas for 5 days. On the 6th day the flowers in formula II were deemed unsaleable. On the 8th day, the carnations and mums in Formulas I and III were deemed unsaleable but the daisys were still fresh enough to be sold. The test was then terminated.

While the present invention is especially suitable for floral arrangements, it can be used for other purposes such as transporting plants, cut flowers, or for rooting of plants. The composition is formed with the required pH properties for the plants and the stems or roots of the plant are inserted into the formed bound aggregate composition. This is particularly important and suitable for transporting plants from countries foreign to the United States as it avoids problems with the bringing of plants into this country in dirt with possible disease, plant insects, and the like.

The present invention, therefore, is well suited and adapted to attain the objects and ends mentioned as well as others inherent therein.

Wile presently preferred embodiments and examples of the inventions have been given for the purposes of disclosure, changes therein and other uses thereof will occur to those skilled in the art which are encompassed within the spirit of the invention as defined by the scope of the appended claims.

What is claimed is:

1. A composition comprised of,
a particulate, water-insoluble, water-retaining binder having water retention properties of at least 100 gm/gm and,
inert aggregate particles dispersed throughout the binder,
the particles being present in an amount and having a bulk density and surface area effective to disperse the composition in water as the composition is added to it without mixing and to provide a firmly bound aggregate support with the water comprised of about 60% to 80% by weight of water.

2. The composition of claim 1 where,
the binder has water retention properties of at least 100 gm/gm.

3. The composition of claim 1 where,
the particles have an apparent bulk density of not more than about 30 lbs/sq.ft. and have a surface area of at least about 10 mg/gm.

4. The composition of claim 1, where,
the binder is present in the composition in an amount of from about 0.1% to about 5.0% by weight.

5. The composition of claim 1 where,
the aggregate is rice hull ash.

6. The composition of claim 1 where,
the aggregate is rice hull ash and is present in the composition in an amount of about 96% by weight, and
sugar is present in an amount of about 3% by weight.

7. The composition of claim 1 where,
the binder is a water-insoluble, water-swellable, cross-linked polymer.

8. The composition of claim 1 where,
the binder is acrylonitrile-starch graft copolymer.

9. The composition of claim 1 where,
the composition has a pH from about 5.5 to about 8.5.

10. The composition of claim 1 where,
the composition includes at least one of a preservative, plant nutrient, a bactericide and an inert coloring agent.

11. A bound water aggregate support having the property of being able to firmly support flowers whose stems are inserted therein and to provide water thereto comprising,
the composition of claim 1 dispersed throughout and formed into a firmly bound aggregate with the water.

12. A method of forming a bound water aggregate support capable of supporting flowers whose stems are inserted therein and providing water thereto comprising,
adding the composition of claim 1 into water in a container in an amount sufficient to form the bound water aggregate support with the water.

13. The method of claim 11 where,
about 0.2 lbs. of the composition is added for each pound of the water present in the container.

14. A method of making a floral arrangement comprising,
performing the steps of claim 12 and
inserting stems of the flowers into the bound water aggregate support.

15. A composition comprised of,
a particulate, water-insoluble, water-retaining binder having water retention properties of at least 100 gm/gm, and
rice hull ash dispersed throughout the binder,
the rice hull ash being present in an amount of from about 95% to about 0.99% by weight,
the particulate binder and the rice hull ash effective to disperse the composition throughout water as the composition is added to it without mixing and to provide a firmly bound aggregate water support comprised of about 60% to 80% by weight of water.

16. The composition of claim 15, where,
the binder is a water-insoluble, water-swellable, cross-linked polymer.

17. The composition of claim 15, where,
the binder is acrylonitrile-starch graft copolymer.

18. The composition of claim 17, where,
the composition has a pH of from about 5.5 to about 8.5.

19. The composition of claim 18, where,
the composition includes at least one of a preservative, bactericide, plant nutrient and inert coloring agent.

20. A bound water aggregate support having the property of being able to firmly support flowers whose stems are inserted therein and to provide water thereto comprising,
the composition of claim 15 dispersed throughout and formed into a firmly bound aggregate with the water.

21. The bound water aggregate support of claim 20, where,
the binder of the composition is a water-insoluble, water-swellable, cross-linked polymer.

22. The bound water aggregate of claim 20, where,
the composition has a pH from about 5.5 to about 8.5, and
the binder is acrylonitrile-starch graft copolymer.

23. The bound water aggregate support of claim 20, where,
the composition has a pH from about 5.5 to about 8.5,
the binder of the composition is acrylonitrile-starch graft copolymer, and
the composition includes at least one of a preservative, bactericide, plant nutrient, and inert coloring agent.

24. The bound water aggregate support of claim 20, where,
the composition has a pH from about 5.5 to about 8.5,
the binder of the composition is acrylonitrile-starch graft copolymer, and
the composition includes about 3.0 by weight sugar.

25. A method of forming a bound water aggregate support in a container, the bound water aggregate support being capable of supporting flowers whose stems are inserted therein and providing water to the stems comprising,
adding the composition of claim 15 into water in the container in an amount sufficient to form the bound water aggregate support with the water in the container.

26. The method of claim 25, where,
about 0.2 pounds of the composition is added for each pound of the water present in the container.

27. A method of making a floral arrangement comprising,
performing the method of claim 26 and,
inserting stems of the flowers into the bound water aggregate support.

28. A method of forming a bound water aggregate support in a container, the bound water aggregate support being capable of supporting flowers whose stems are inserted therein and providing water to the stems comprising, adding the composition of claim 17 into water in the container in an amount sufficient to form the bound water aggregate support with the water in the container.

29. The method of claim 27, where, about 0.2 pounds of the composition is added for each pound of the water present in the container.

30. A method of making a floral arrangement comprising, performing the method of claim 29, and, inserting the stems of the flowers into the bound water aggregate support.

* * * * *

UNITED STATES PATENT OFFICE
CERTIFICATE OF CORRECTION

Patent No. 4,238,374      Dated December 9, 1980

Inventor(s) Robert L. Durham and John H. McKenzie

It is certified that error appears in the above-identified patent and that said Letters Patent are hereby corrected as shown below:

Column 1, Line 19, change "forms" to -- foams --

Column 8, Line 63, change "Wile" to -- While --

Column 5, Line 37, change "we" to -- as --;

Column 5, Line 49, change "substantiably" to -- substantially --;

Column 7, Line 23, change "it" to -- one --;

Column 8, Line 42, change "daisys" to -- daisies --;

Column 8, Line 47, change "daisys" to -- daisies --

Signed and Sealed this

Twenty-first Day of April 1981

[SEAL]

Attest:

RENE D. TEGTMEYER

Attesting Officer     Acting Commissioner of Patents and Trademarks